Oct. 19, 1971  W. A. DOERNER  3,613,368
ROTARY HEAT ENGINE

Filed May 8, 1970  3 Sheets-Sheet 1

INVENTOR:
WILLIAM A. DOERNER
BY Howson & Howson
ATTYS.

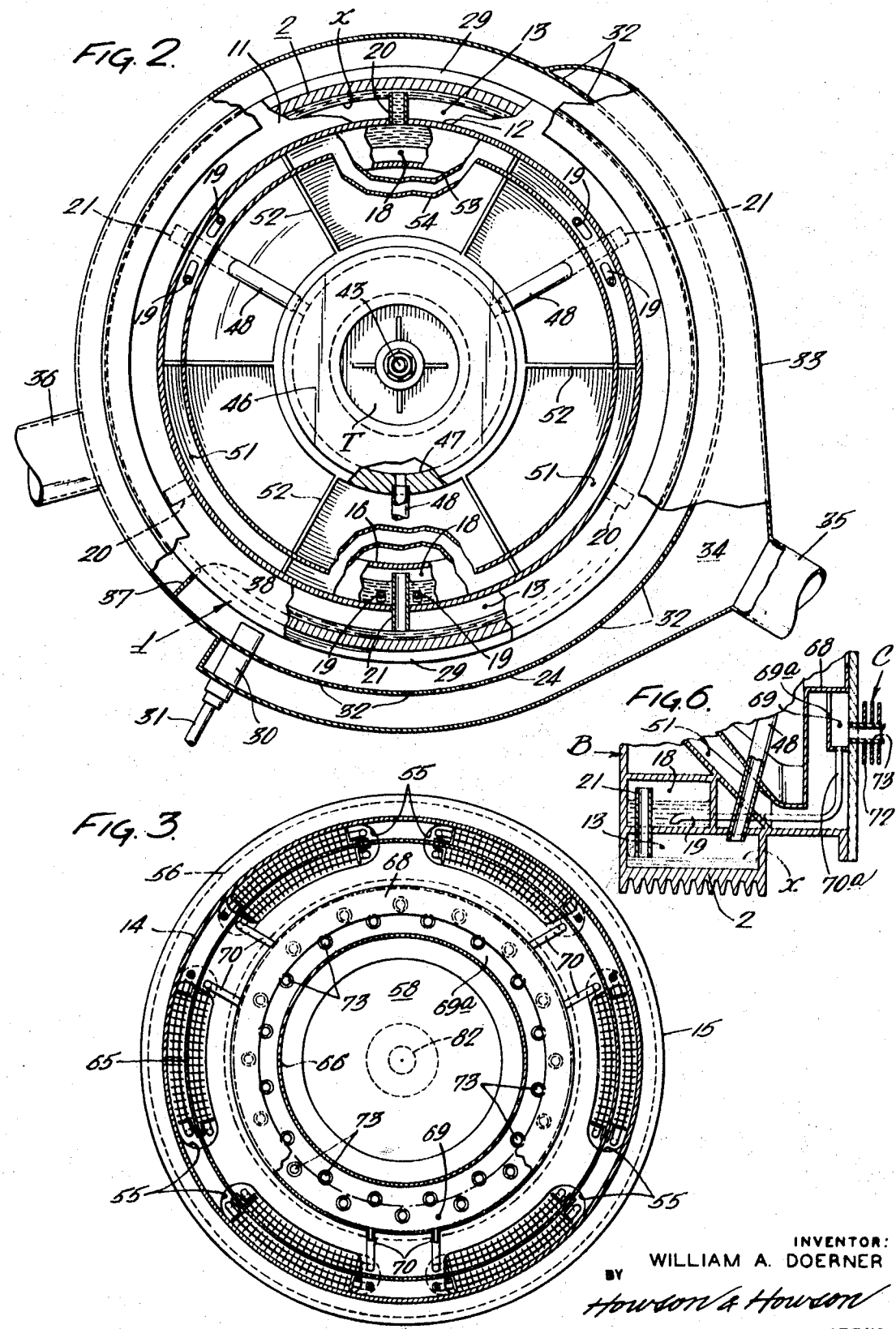

Oct. 19, 1971   W. A. DOERNER   3,613,368
ROTARY HEAT ENGINE
Filed May 8, 1970   3 Sheets-Sheet 3
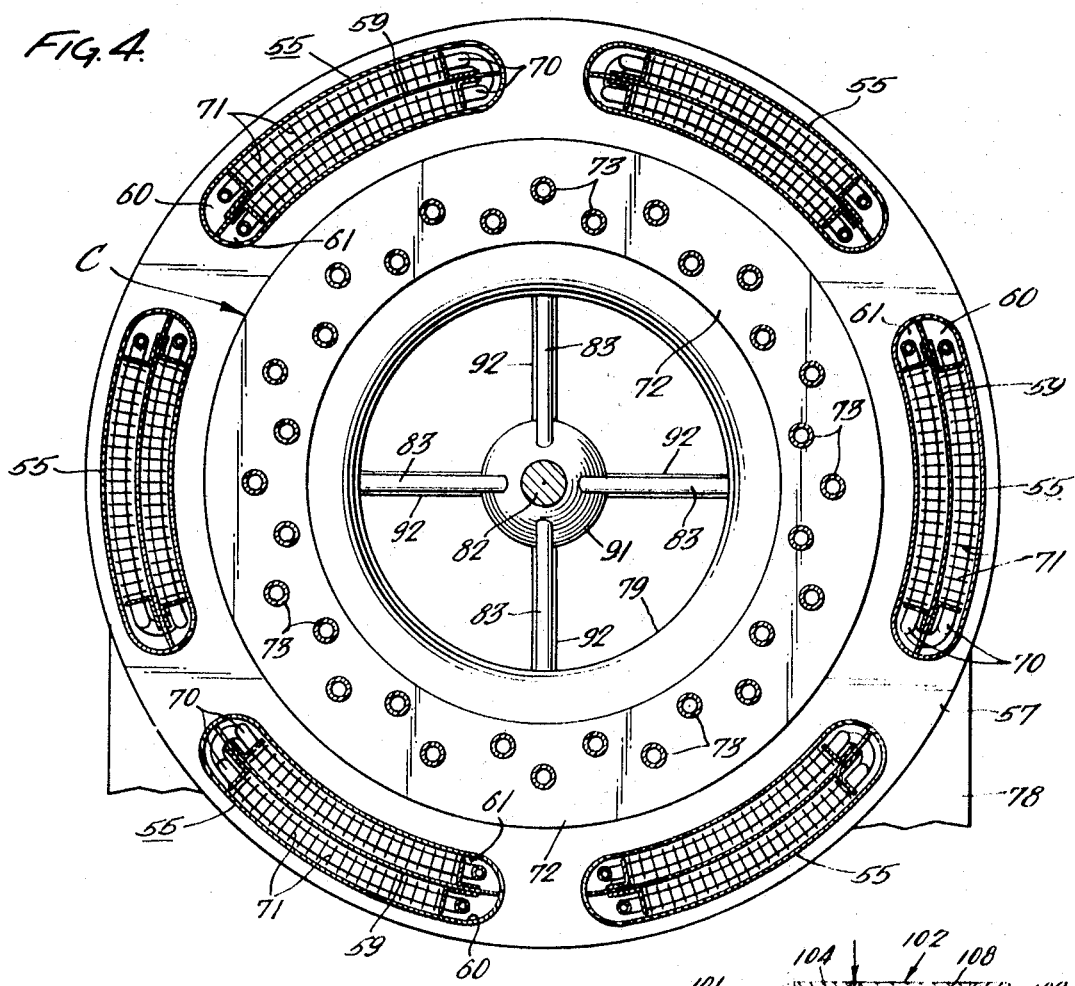
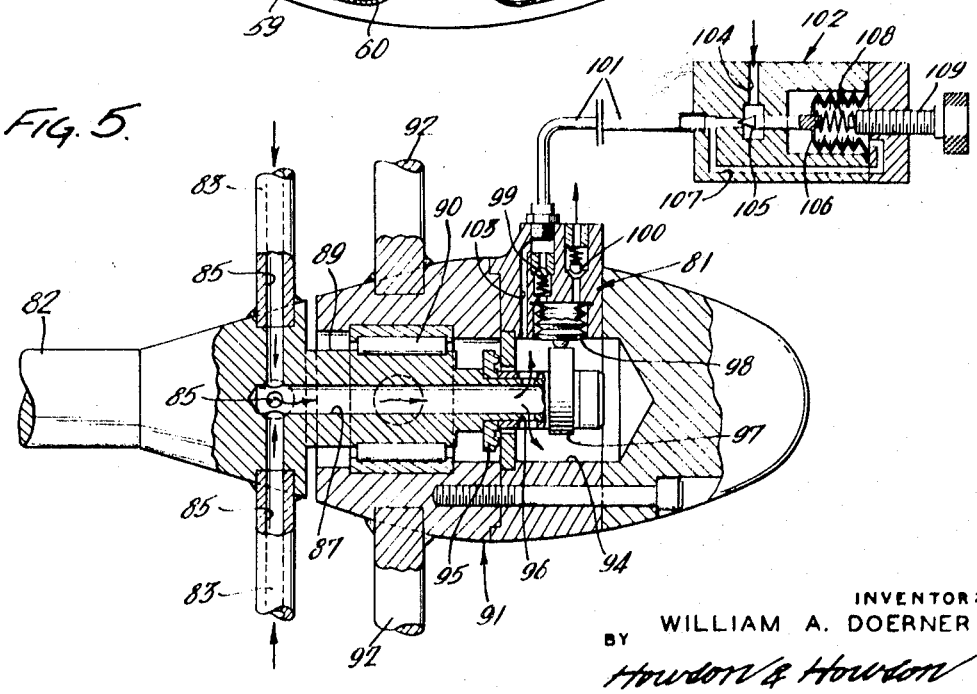
INVENTOR:
WILLIAM A. DOERNER
BY
Howson & Howson
ATTYS.

United States Patent Office 3,613,368
Patented Oct. 19, 1971

3,613,368
ROTARY HEAT ENGINE
William A. Doerner, Wilmington, Del., assignor to E. I. du Pont de Nemours and Company, Wilmington, Del.
Filed May 8, 1970, Ser. No. 35,712
Int. Cl. F01k 11/04
U.S. Cl. 60—95                                18 Claims

ABSTRACT OF THE DISCLOSURE

A closed cycle Rankine rotary engine comprising a boiler, expander and condenser. The boiler is of annular configuration and is rotationally driven about its axis at predetermined speed to maintain in the boiler an annular body of liquid having an inner surface level spaced a predetermined distance radially outward from the rotation axis. The condenser is mounted coaxially adjacent the boiler to rotate therewith as a unit and comprises an array of annular radial fins having axial heat exchange tubes extending therethrough in which the exhaust vapor from the expander is condensed by heat exchange with a cooling fluid discharged outwardly between said fins. The condenser heat exchange tubes are spaced radially outward from the rotation axis a predetermined distance less than the boiler liquid inner surface level and the spacings of said liquid surface level and heat exchange tubes are correlated with respect to each other and the rotational speed of the boiler to provide the required radial distance between the tubes and liquid surface necessary to produce the boiler liquid pressure required to maintain the desired boiler vapor pressure at said speed of rotation.

---

This invention relates to rotary heat engines, and more particularly to rotary heat engines of the closed cycle Rankine type especially adapted for use with high molecular weight power fluids.

Rotary heat engines comprising a rotatable boiler-condenser unit and an expander are known in the art. However, prior to the present invention such engines have been characteristically inefficient and of substantially bulky and heavy construction requiring substantial power to drive the boiler-condenser unit at the desired speed. Also, such prior rotary engines have been noisy in operation. Furthermore, such prior engines have been characterized by production of low quality vapor and heat fluxes below the peak boiling level for normal gravity. For these reasons such rotary engines have not experienced wide usage or marked commercial success.

Heat engines using continuous external combustion offer a low polluting alternative to the internal combustion engine. However, one type of such a heat engine, the closed cycle Rankine engine, usually is at a disadvantage in the size range normally considered portable because of the size and weight of the boiler-condenser. For these reasons, closed cycle Rankine engines have not come into general use for portable engine applications despite their ability to operate with low production of atmospheric pollutants.

With the foregoing in mind, an object of the present invention is to provide a rotary heat engine of the type described embodying novel features of design and construction operable to produce high quality vapor with steady flow of both vapor and liquid independent of the earth's gravity field and orientation and capable of producing heat fluxes well above the peak boiling level for normal gravity.

Another object of the invention is to provide a rotary engine as set forth having high performance characteristics and providing maximum total heat exchange between the expander exhaust vapor and the cooling fluid in the condenser component of the engine.

Another object of the invention is to provide a rotary engine of the type described which is of relatively small compact size and lightweight construction requiring low power consumption to rotationally drive the boiler-condenser unit at the desired speed.

A further object of the invention is to provide a rotary engine as set forth embodying novel features of design and construction affording comparatively noiseless operation of the engine.

More particularly, an object of the invention is to provide a novel rotary engine having the features and attributes set forth which can be operated efficiently with minimum pollution of the atmosphere and can be used effectively for the propulsion of land and marine vehicles as well as for supplying heat and power for domestic and industrial purposes.

These and other objects of the invention and the various features and details of construction and operation thereof are hereinafter set forth and described with reference to the accompanying drawings, in which:

FIG. 2 is a view partially in section on line 2—2, FIG. 1;

FIG. 3 is a sectional view in reduced scale on line 3—3, FIG. 1;

FIG. 4 is a sectional view, slightly enlarged on line 4—4, FIG. 1;

FIG. 5 is an enlarged fragmentary sectional view illustrating certain details of the rotary engine shown in FIG. 1, and FIG. 6 is a fragmentary view showing an arrangement for returning condensate directly to the boiler in engines having no regenerator.

Figure 1:
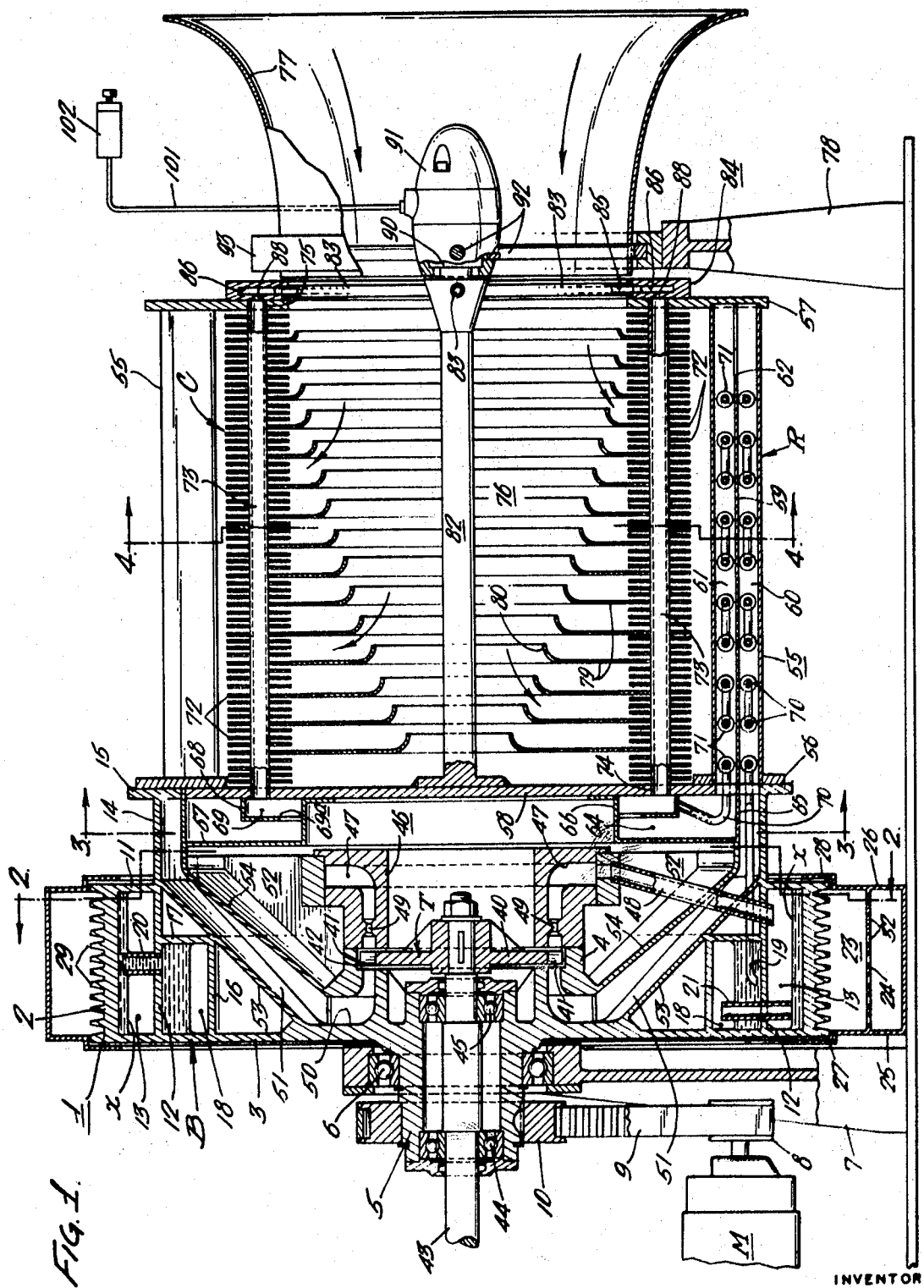
FIG. 1 is a vertical sectional view diametrically through a rotary heat engine embodying the present invention and comprsiing a closed cycle Rankine power generation system including a rotary boiler, an expander and a rotary condenser.

Referring now to the drawings, and more particularly to FIG. 1 thereof, a rotary engine in the form of a closed cycle Rankine power system embodying the present invention may comprise a rotary boiler B, a suitable expander such as, for example, a turbine T and a rotary condenser C coupled to the boiler for rotation therewith.

As shown in FIG. 1, the rotary boiler B comprises a cylindrical casing 1 having an outer continuous circumferentially extending wall 2 and a side wall 3 that extends radially inward of the casing terminating in an annular coaxial turbine housing portion 4 concentrically within the outer wall 2 and a coaxial tubular hub portion 5. The hub portion 5 is rotatably journalled in a bearing 6 that is mounted in a fixed standard or support 7, and the boiler may be rotationally driven at the desired speed by means of an electric motor M driving a pulley 8 and belt 9 which in turn drives a pulley 10 secured on the hub portion 5.

At the opposite side of the casing wall 2 from the side wall 3 is an annular side wall 11 of relatively short radial extent that terminates at an inner continuous circumferential wall 12. The wall 12 extends from the casing wall 3 and cooperates with the outer casing wall 2 and said wall 11 to define therewith an annular boiler chamber 13. The inner wall 12 extends axially inward beyond the annular wall 11 as indicated at 14, and terminates in a radially extending annular flange 15.

A coaxial cylindrical wall 16 spaced inwardly from the wall 12 cooperates with an annular radial wall 17 and the walls 12 and 3 to define therewithin an annular boiler feed liquid chamber 18. Boiler feed liquid is admitted to the chamber 18, for example, in the form of liquid condensate, through a pipe 19 from the condenser C as more particularly described hereinafter.

The boiler casing 1 is rotationally driven about its axis by any suitable means such as a motor M at a predetermined speed of rotation calculated to create the centrifugal force necessary to maintain the selected boiler feed liquid uniformly distributed circumferentially about the boiler chamber 13 in contact with the inner surface of the casing wall 2 and to provide the desired boiler (vapor) pressure. The interface between the liquid and vapor generated in the chamber 13 is highly stable and is essentially cylindrical and concentric with the axis of rotation of the boiler B. Similarly, the boiler feed liquid in the chamber 18 is uniformly distributed circumferentially about the inner surface of the cylindrical wall member 12.

The boiler feed liquid preferably is supplied from the chamber 18 to the boiler chamber 13 by means of a plurality of radially disposed feed conduits 20 mounted in the cylindrical wall 12 and equally spaced circumferentially thereabout to insure rotational balance in the boiler. As shown, the radial inner ends of the conduits 20 are disposed flush with the inner surface of the wall 12 and the radial outer ends of said conduits 20 are spaced inwardly from the inner surface of the casing outer wall 2 and extend or terminate below or beyond the liquid surface level $x$ so that the outer ends of said conduits 20 are immersed in and covered by the annular body of liquid maintained uniformly about the inner surface of the boiler wall 2 by rotation of the boiler casing.

The body of liquid in the boiler chamber 13 of the casing 1 is maintained at the desired predetermined level $x$ by means of a plurality of radial sensor tubes or conduits 21 also mounted in the circumferential wall 12 of the boiler chamber 13 and operable in accordance with the invention set forth and described in the copending application for U.S. Patent of William A. Doerner, filed Feb. 18, 1970, Ser. No. 12,296. As in the case of the liquid supply conduits 20, the sensor conduits 21 are equally spaced circumferentially with respect to each other and the conduits 20 to insure rotational balance in the boiler. It is important to note that the radial outer ends of the conduits 21 are disposed at the radius of the desired predetermined surface level $x$ of the body of liquid in the boiler chamber 13. The inner ends of the conduits 21 are open to the interior of the chamber 18 and extend radially inwardly to a point substantially spaced from the surface of the annular body of liquid about the inner periphery of the chamber 18.

As shown in FIGS. 1 and 2, the annular body of liquid in the boiler chamber 13 may be heated to the required boiling temperature to vaporize the same, for example, by the combustion of a suitable fuel-air mixture in a combustion box 23 such as shown in the drawings. The combustion box 23 is a stationary structure of annular configuration that circumscribes the rotatable boiler casing 1 and comprises a radially spaced circumferential wall 23 and spaced apart annular side walls 25 and 26, the latter having offset inner flange portions 27 and 28 that closely overlie the peripheral edge portions of the opposite side walls 3 and 11 of the boiler casing 1. The combustion box 23 defines an annular combustion chamber surrounding the casing 1 and the outer surface of the casing peripheral wall 2 is provided with a plurality of circumferentially extending radial fins or ribs 29 to provide maximum efficiency of heat transfer from the combustion chamber to the annular body of liquid in the boiler casing 1 to heat the liquid to the desired boiling temperature.

Referring to FIG. 2, fuel is discharged tangentially into the combustion chamber from a nozzle 30 to which the fuel is supplied at the required rate and pressure by a pipe 31, and air for mixture with the fuel is discharged into the combustion chamber through a plurality of ports 32 in a substantial segment of the peripheral wall 24 of the combustion chamber. The ports 32 are enclosed within a hood structure 33 that defines a plenum chamber 34 into which the air is supplied through a duct 35 from a pump or fan (not shown) at the pressure and volume required for efficient combustion of the fuel to heat the liquid in the boiler casing to the desired temperature.

Combustion of the fuel-air mixture extends substantially about the entire circumference of the rotating boiler and the residual products and gases of combustion are discharged through an outlet or exhaust duct 36. A stationary baffle 37 having projecting portions 38 for complementary interfitting cooperation with the fins or ribs 29 on the rotating boiler casing 1 is mounted transversely of the combustion chamber intermediate the fuel nozzle 30 and outlet duct 36, as shown in FIG. 2, to prevent recirculation of the combustion gases through the combustion chamber. To avoid pollution of the ambient atmosphere the fuel employed to heat the boiler fluid should contain no atmospheric pollutants and, for example, pure hydrocarbon fuels free of sulfur, nitrogen, lead and other contaminants, can be used effectively.

In the illustrated embodiment of the invention, the expander, in the form of a turbine T, is of the single stage type comprising a rotor 40 having a series of turbine blades 41 arranged peripherally thereabout. The turbine rotor 40 is received with an annular recess 42 provided in the housing portion 4 and is mounted for coaxial rotation independently of the boiler B on a shaft 43 that is rotationally supported within the tubular hub portion 5 by means of bearings 44 and 45.

An annular nozzle ring 46 is mounted coaxially adjacent the inner peripheral surface of the turbine rotor 40, and an annular high pressure vapor manifold 47 is provided therein. High pressure vapor is supplied from the boiler chamber 13 to the manifold 47 by a plurality of vapor tubes 48 arranged in equally spaced relation circumferentially of the axis to insure rotational balance in the boiler. The high pressure vapor is discharged from the manifold 47 through a plurality of nozzles 49 provided in the ring 46 at equally spaced intervals circumferentially thereof and disposed in confronting relation to the turbine blades 41 so that the high pressure vapor discharged from the manifold 47 through the nozzles 49 impinges upon said blades 41 and drives the turbine rotor 40 and its shaft 43 at the desired speed of rotation. The turbine shaft 43 may be used to drive any selected equipment or machinery such as, for example, an electric generator, a wheeled vehicle, a power-takeoff mechanism, or otherwise, as desired.

An annular manifold 50 to receive the exhaust vapor from the expander, such as turbine T, is provided in the housing portion 4 and the inlet opening thereto is disposed in confronting relation to the turbine blades 41 at the opposite side thereof from the nozzles 49. Exhaust vapor entering the manifold 50 is discharged into an annular series of ducts 51 arranged circumferentially of the rotational axis and extending angularly outward from the exhaust manifold 50 to a regenerator R associated with the condenser C. The ducts 51 are formed by a series of radially extending partitions 52 equally spaced circumferentially of the axis and by spaced apart angularly disposed plates 53 and 54 mounted and extending between adjacent partitions 52, for example, as best shown in FIGS. 1 and 2 of the drawings. The partitions 52 also function to support the nozzle ring 66 in position coaxially adjacent the turbine rotor 40.

As hereinafter set forth, a regenerator R may or may not be required in rotary engines of the present invention depending upon the particular power fluid employed in the boiler B. However, in the embodiment of the invention disclosed in FIGS. 1, 3 and 4 of the drawings, a regenerator R is provided comprising a plurality of elongated tubular housings 55 of arcuate cross-sectional shape as shown in FIG. 4, and arranged in equally spaced relation circumferentially about the condenser C. The opposite ends of the regenerator housing 55 are fixedly secured to annular mounting rings or frames 56 and 57, the latter ring 57 forming the outer end support ring of the condenser C. The regenerator support ring 56 is bolted or otherwise secured to the flange 15 on the extension 14 of the boiler wall 12, and said ring 56 is also bolted or otherwise secured to the periphery of a condenser support plate 58 so that the condenser C and regenerator R are mounted coaxially of the boiler B and rotate therewith as a unit.

Each of the regenerator housing 55 is subdivided by a longitudinally extending circumferentially disposed partition 59 to provide axially extending outer and inner vapor passages 60 and 61, and each partition 59 terminates short of the end ring 57 as indicated at 62 to provide communication between the vapor passages.

The condenser C comprises an annular vapor chamber 64 defined by outer and inner continuous cylindrical walls 65 and 66, an intermediate radial wall 67 and an adjacent portion of the condenser support plate 58, as best shown in FIG. 1. The annular vapor chamber 64 is arranged at the opposite side of the plate 58 from the regenerator housing 55 and is in open communication with the upper regenerator passages 61 to receive the exhaust vapor from the turbine T.

An annular partition 68 of L-shape in cross-section is mounted in the vapor chamber 64 and provides a circumferential collector 69 for the liquid condensate produced by condensation of the turbine exhaust vapor as hereinafter described. Condensate received in the collector 69 is discharged therefrom through a plurality of conduits or tubes 70, one for each regenerator housing 55, which extend longitudinally first through the inner vapor passage 61 and then in the reverse direction through the outer vapor passage 60. The terminal ends of the conduits 70 are connected to the pipes 19 which return the liquid condensate to the boiler liquid supply chamber 18 as previously described. To provide optimum heat exchange between the turbine exhaust vapors in the passages 60 and 61 and the liquid condensate flowing in the conduits 70, the said conduits may be snaked back and forth crosswise in the passages 60 and 61 of the regenerator housings 55, for example, as shown in FIG. 1 of the drawings, and each of the transverse courses of said conduits 70 are provided with a plurality of annular heat exchange fins 71 of good heat conducting material suitably bonded to the surface of the conduits 70.

As shown in FIG. 1, mounted outwardly adjacent the support plate 58 for rotation therewith, is an array of annular fins 72 arranged coaxially of the boiler B in predetermined equally spaced parallel relation. The fins 72 consist of separate or independent annular disk elements supported and secured in the desired closely spaced parallel relationship with respect to one another and the plate 58 by means of a plurality of heat exchange tubes or pipes 73 that extend longitudinally through the fins 72 parallel to the rotational axis thereof. The fins 72 and tubes 73 are fabricated of metal having high thermal conductivity such as, for example, copper or aluminum, and said fins preferably are bonded to said heat exchange tubes 73 by brazing, soldering or the like, to provide maximum thermal conductivity therebetween.

The tubes or pipes 73 are arranged in equally spaced radially staggered relation circumferentially of the fins 72 as shown in FIG. 4 of the drawings. The inner ends of the tubes 73 are mounted and secured in corresponding openings 74 provided through the support plate 58 so that the interiors of the tubes 73 are in communication with the interior of the collector ring 69 and the vapor chamber 64. The outer ends of the tubes 73 are mounted and secured in openings 75 provided in the annular end ring 57 that is disposed coaxially adjacent the outermost of the fins 72.

Referring still to FIG. 1, the outer radius of all of the fins 72 is the same and the inner radius of said annular fins is also the same with certain exceptions hereinafter described. The inner peripheral edges of the fins 72 define internally thereof a coaxial inlet chamber 76 for the cooling fluid to be discharged outwardly by and between the plurality of rotating fins 72 as hereinafter set forth. The inner diameter of the ring 57 is substantially the same as the inner diameter of the adjacent group of fins 72 so as not to restrict the flow of fluid into the chamber 76, and an outwardly flared or bell shaped fluid intake member 77 is fixedly mounted on a stationary base or support 78 in coaxial relation outwardly adjacent the end ring 57 as shown in FIG. 1.

Also, as shown in FIG. 1, selected fins 72 in the series have inner radii smaller than the remainder of the fins 72 so that said selected fins are extended further into the fluid chamber 76 beyond the inner edges of the other fins 72, as indicated at 79. The inner radii of these extended fins 79 are graduated so that the extent of inward projection thereof into the chamber 76 progressively increases in the direction axially inward of said chamber as shown. The inner peripheral edge portion of each of the extended fins 79 is curved axially outward as indicated at 80 and the axial spacing between said fins 79 and the inner radii thereof are determined and arranged to effect substantially uniform distribution of the cooling fluid from the chamber to the spaces between the series of spaced fins 72.

The axial spacing or distance between the adjacent fins 72 is determined with relation to the rotational speed at which the condenser is driven and to the inner and outer radii of said fins so as to utilize the viscous properties of the cooling fluid and the shear forces exerted thereon by the rotating fins 72 to pump the fluid radially outward between said fins in accordance with the invention set forth and described in the copending application for U.S. patent of William A. Doerner, filed Apr. 6, 1970, Ser. No. 25,857, now abandoned in favor of continuation-in-part application Ser. No. 110,478, filed Jan. 28, 1971.

Thus, upon rotation of the fins 72 at the predetermined speed related to the spacing of the fins and their radii, a cooling fluid, such as air, is caused to flow inwardly through the intake member 77 and ring 57 to the chamber 76 and enter radially into the spaces between the fins 72 where it is accelerated by the shear forces generated by the velocity difference or slip between the fins and the fluid. As the cooling fluid is accelerated and forced outwardly between the fins 72 the fluid is pressurized and discharged at the outer edges of said fins and thence outwardly about and between the regenerator casings 55.

In lieu of the fins 72 consisting of a plurality of separate disk elements as shown in FIG. 1 of the drawings, the fins 72 may be formed by adjacent turns or coils of a continuous spiral or helical arrangement of a flat strip of high thermally conductive material with separate inner fin extensions, as shown and described in the aforesaid copending application of William A. Doerner, Ser. No. 110,478.

As previously stated, a regenerator R is not always necessary and whether or not a regenerator is required for any given engine depends upon the ratio of the entropy of vaporization to the heat capacity of the vapor at the normal boiling point ($\Delta S/C_p$) of the particular power fluid employed in the boiler B of such engine. Thus, in the case of power fluids for which $\Delta S/C_p$ approaches one (1), a regenerator is not required, but for power fluids for which $\Delta S/C_p$ is less than one (1) regeneration is necessary and the smaller the value of $\Delta S/C_p$ the more regeneration is required. In engines of the present invention which do not require a regenerator R the condensate received in the collector 69 is discharged through conduits 70a directly to the feed pipes 19 and boiler chamber 18 as shown, for example in FIG. 6 of the drawings.

An important factor in rotary engines of the present invention resides in the relative radial positions of the condenser C with respect to the boiler liquid level line $x$, and also the position of the regenerator R where one is employed. To be operable, the radius or distance of the condenser tubes 73 from the axis of rotation of the engine must, of course, be less than the radius or distance of the boiler liquid level $x$ from said axis in order to return the condensate from the collector 69 to the boiler chamber 18 utilizing the centrifugal forces generated by rotation of the boiler-condenser assembly. However, not only must this general relationship be present, but the radial distances from the rotation axis to the condenser tubes 73 and to the boiler liquid level $x$ are highly important and determinative of the vapor pressure generated in the boiler 13 at the specified rotational speed of the engine.

Accordingly, for any given engine speed of rotation, to provide the boiler liquid pressure required to maintain the desired vapor pressure in the boiler chamber 13, the radial distances to the condenser tubes 73 and to the boiler liquid level $x$ are critical and must be predetermined. Also, in engines employing a regenerator, the regenerator must be disposed at a greater radial distance from the rotational axis than the condenser tubes 73 and at a less distance from the axis than the boiler liquid level $x$. Preferably, the outer radius of the regenerator R is in axial alignment with the boiler inner wall 12 as shown in FIG. 1.

Because of these requirements and limitations with respect to the relative radial positions of the condenser tubes 73 and boiler liquid level $x$, it has not been possible heretofore to provide an operative highly efficient closed cycle Rankine rotary engine of small compact size and lightweight construction capable of generating a high quality vapor having heat flux well above the peak boiling level for normal gravity with a steady flow of both vapor and liquid independent of gravity field and orientation. The present invention makes such an engine possible by the disclosed combination of rotary boiler, expander and a rotary condenser that is constructed and operable, by utilizing viscosity shear forces to pump the cooling fluid through the condenser fins 72, and provide the required condenser capacity under optimum operating conditions for the engine as well as the required radial positioning of the condenser tubes 73 and the boiler liquid level $x$ necessary to produce the boiler liquid pressure required to maintain the desired boiler vapor pressure at the selected speed of engine rotation. Also, the optimum operating conditions of the engine combination permit the use of expanders, such as the nozzles 49 and turbine T, of small compact size that fits conveniently within the boiler B, for example, as shown in FIG. 1. Of course, when an expander for converting heat energy to mechanical power, such as the turbine rotor 40, is not employed or is held inoperative, the engine becomes simply an efficient, compact means for transforming fuel energy into heated clean air discharged from the condenser.

In operation of the rotary engine shown and described herein, the boiler B and condenser C with its associated regenerator R are driven at the predetermined speed of rotation, and the annular body of liquid in the boiler chamber 13 is heated to the desired temperature and pressure by combustion of the fuel-air mixture in the chamber 23. The vapor under pressure produced by the boiling liquid is discharged from the chamber 13 inwardly through the tubes 48 to the manifold 47 in ring 46 which is rotating with the boiler and thence is discharged from the nozzles 49 into impinging contact against the turbine blades 41 thereby driving the turbine rotor 40 and the shaft 43 at the predetermined desired speed of rotation relative to rotation of the boiler and condenser assembly.

The exhaust vapor from the turbine enters the manifold 50 and is discharged therefrom through the ducts 51 into the lower chambers 60 in the housings 55 of the regenerator R. The ducts 51 function as a subsonic diffuser in which the exhaust vapor is isentropically decelerated to convert available kinetic energy to static pressure with a resulting increase in condenser pressure and temperature to provide improved condenser efficiency.

The exhaust vapor travels lengthwise through the outer chambers 60 in the regenerator housings 55 and then in the reverse direction through the inner chambers 61 thereof into the annular chamber 64 of the condenser C. From the chamber 64 the exhaust vapor enters the collector 69 through openings 69a and then passes into the heat exchange tubes 73 where the vapor is condensed by heat exchange with a cooling fluid, such as ambient air, discharged outwardly between the spaced fins 72 as previously described.

The condensate thus formed in the tubes 73 flows into the collector 69 from which it is discharged radially by centrifugal force generated by rotation of the condenser C. As shown, the condensate is discharged from the collector 69 through the plurality of conduits 70 that traverse the inner and outer chambers 61 and 60 in the regenerator housings 55 and is returned to the boiler supply chamber 18 through the pipes 19. As the condensate flows through the conduits 70 in the regenerator housings 55, the condensate is pre-heated by heat exchange with the exhaust vapor flowing through the regenerator housings which is thus pre-cooled to a corresponding degree. The cooling air discharged outwardly from the fins 72 also assists in cooling the exhaust vapor as it travels through the regenerator housings 55. During operation of the engine the liquid in the boiler chamber 13 is automatically maintained substantially continuously at the level indicated by the line $x$, shown in the drawings, by reason of the intercooperation between the sensor conduits 21 and feed conduits 20 as described in the aforesaid copending application of William A. Doerner, Ser. No. 12,296. Also, in some rotary engines of the present invention, depending upon the degree of efficiency of the regenerator, it may be necessary or desirable to provide suitable means (not shown) for desuperheating the exhaust vapor after the vapor leaves the regenerator and before it enters the heat exchange tubes 73.

As previously stated, rotary engines of the present invention are particularly adapted for use in closed Rankine cycle power systems and especially in such power systems where it is desired to make efficient use of high molecular weight fluids having normal boiling points of from about 100° C. to 250° C. which are required for expanders such as nozzles and a low speed, single stage turbine.

For a typical example a closed cycle Rankine rotary engine embodying the present invention and having an output of 20 H.P. at the turbine shaft 43 comprises a boiler B having an internal diameter of 18.50" and an axial internal length of 3.60". The diameter of the turbine T at the blades 41 is 4.66" and the fins of the condenser C have an outer diameter of 12.38" and an inner diameter of 8". The axial length of the series of fins is 12" and the spacing between adjacent fins 72 is 0.032". The boiler-condenser assembly is rotationally driven at a speed of 2400 r.p.m. by the motor M and the blades 41 of the turbine T are oriented with respect to the nozzles 49 to rotationally drive the turbine in the direction opposite to rotation of the boiler-condenser assembly. Using as the boiler power fluid a high molecular weight fluid, such as bis(trifluoromethyl) benzyl alcohol, previously mentioned, the specifications for a typical operation of the desired engine are as follows:

| | |
|---|---|
| Boiler temperature (° F.) | 527 |
| Boiler pressure (p.s.i.a) | 144 |
| Turbine speed (r.p.m.) | 30,000 |
| Condenser temperature (° F.) | 230 |
| Condenser pressure (p.s.i.a.) | 3 |
| Power fluid flow rate, lb./sec. | 0.680 |
| Rankine cycle efficiency (70% regenreation) | 0.238 |
| Boiler load (70% regeneration) $10^3$/B.t.u./hr. | 268 |
| Condenser load (70% regeneration) $10^3$ B.t.u./hr. | 217 |
| Regeneration load (70% regenreation) $10^3$ B.t.u./hr. | 95 |

In certain closed cycle Rankine power systems such as those that are not enclosed inhermetically sealed housings or that employ power fluids not completely stable, the exhaust vapor entering the condenser C may include small percentages of entrained air or other vapors that are not condensable in the tubes 73 by heat exchange with the cooling fluid discharged between the fins 72 of the condenser. In such cases it is desirable to remove these noncondensables so that they are not returned to the boiler B and recirculated through the closed system.

This may be accomplished by a scavenging mechanism, for example, such as shown in FIGS. 1 and 5 of the drawings, comprising a vacuum pump assembly 81 mounted at the outer end of a coaxially extending shaft 82. The shaft 82 is rotatable with the condenser C and has its inner end fixedly secured to the support plate 58. The outer end of the shaft 82 is supported by a plurality of spoke-like elements 83 arranged in equally spaced circumferential relation with their outer ends secured in a ring member 84 that is secured to the outer face of the condenser end ring 57. The spokes 83 are tubular as shown and provide communicating passages 85 between an annular chamber 86 in ring member 84 and a coaxial bore 87 provided in the outer end of the shaft 82. Communication between the outer ends of each of the condenser tubes 73 and chamber 86 is provided by a restricted opening 88 in the ring 84.

The outer end of the shaft 82 is of reduced diameter as indicated at 89 and is journalled by means of a bearing 90 mounted in a stationary housing 91 of airfoil external contour fixedly supported coaxially on the reduced end of the shaft 82 by radial spokes 92 having their outer ends mounted in a ring 93 secured on the stationary standard or base 78.

Provided within the housing 91 is a chamber 94 closed by a seal 95 about the shaft end, and in communication with the shaft bore 87 through radial ports or passages 96 in the shaft 82. A cam 97 is fixedly secured to the end of the shaft 82 within the chamber 94 and upon rotation of the shaft 82 with the boiler-condenser assembly said cam actuates a spring bellows 98 that operates as hereinafter described to alternately open and close a pair of check valves 99 and 100.

The check valve 100 when open is in communication with the ambient atmosphere as indicated by the arrow in FIG. 5. The inlet port of check valve 99, on the other hand, is connected by a capillary tube 101 with a vacuum control device 102. Communication between said port and chamber 92 is also provided by a passageway 103 in the valve housing.

The control device 102 has an air inlet passage 104 that communicates with the adjacent end of tube 101 under the control of a regulating needle valve 105. A second passageway 107 also connects the tube 101 with the interior of a bellows 106 which is fixedly secured to the stem of valve 105. A compression spring 108 mounted between the bellows internally thereof and the end of an adjusting screw 109 serves to bias the valve 105 to the closed position. This bias may be varied as required by manual adjustment of the screw 109. In operation, the vacuum developed in tube 101 by the pumping action of bellows 98 effectively counters the action of spring 108 by way of passage 107, and the extent of opening of needle valve 105 and consequently the amount of air bled into the system through port 104 can be precisely controlled by varying the sensitivity of the said valve by means of the adjusting screw 109.

In operation of the scavenging mechanism, as shown in FIG. 5, the cam 97 is engaged with the bellows 98 on the high point of said cam so that said bellows 98 is compressed the maximum extent, the check valve 99 is closed and check valve 100 is open to the atmosphere. Upon rotation of the cam 97 through 180° to the low point thereon, the spring bellows 98 expands thereby opening check valve 99 and closing check valve 100. Expansion of the bellows 98 creates a vacuum or suction force through the open valve 99 that operates to withdraw noncondensable vapors from the condenser tubes 73 through openings 88, chamber 86, passages 85, bore 87, chamber 94 and passage 103 and into the said bellows 98, together with a predetermined amount of ambient air through the inlet passage 104 and capillary tube 101. The needle valve 105 is adjusted to restrict the amount of air admitted to the capillary tube 101 from the passage 104 to maintain the desired predetermined proportion between the air bled into the system and the non-condensables withdrawn from the condenser tubes 73. As the cam 97 rotates through a second 180° to again engage the high point of said cam with the bellows 98, the latter is compressed, thereby closing the check valve 99 and opening the check valve 100 to discharge from the bellows 98 the non-condensable fluids drawn into said bellows during the preceding expansion stroke thereof. The cycle of operation is repeated during each revolution of the cam 97 relative to the bellows 98.

Such a scavenging mechanism for non-condensables generally is not needed for engines that are enclosed in hermetically sealed housings and employ highly stable power fluids, and in such engines the small percentages of non-condensables that may accumulate in the system during operation of the engine over a period of time can be removed by evacuating the engine periodically as required.

From the foregoing it will be apparent that the present invention provides a novel rotary heat engine that fulfills the objectives and purposes hereinabove set forth, and while particular embodiments of such an engine have been shown and described, it is not intended to limit the invention to such disclosures and it is contemplated that changes and modifications may be made and incorporated as desired or required, within the scope of the following claims.

I claim:
1. A closed cycle Rankine engine comprising,
an annular boiler rotatable about its axis at a predetermined speed adapted to maintain an annular liquid body in said boiler extending continuously about the inner peripheral surface thereof with the boiler liquid inner surface spaced a predetermined distance radially outward from the rotation axis,
means to heat the liquid body in the boiler to generate pressure vapor therein,
an expander system for extracting work from the pressure vapor generated by heating the liquid in the boiler,
a condenser for the exhaust vapor from said expander including a plurality of axially spaced annular fins mounted coaxially with the boiler for rotation therewith,
the axial spacing of said fins and the inner and outer radii thereof being correlated with respect to one another and to speed of rotation thereof to cause a cooling fluid to be conveyed by viscosity shear forces outwardly between the fins in optimum heat exchange relation therewith,
heat exchange tubes for condensing the exhaust vapor therein by heat exchange through said fins with a cooling fluid passing therebetween,
said heat exchange tubes extending axially through said fins and being spaced from said rotation axis a predetermined distance less than the boiler liquid inner surface,
and means for returning the vapor condensate from the condenser to the boiler,
the radial spacing of said heat exchange tubes and boiler liquid inner surface relative to each other and the rotation axis being correlated to the speed of rotation of the boiler and condenser to provide the required radial distance between the heat exchange tubes and boiler liquid inner surface necessary to produce the boiler liquid pressure required to maintain the desired boiler vapor pressure at said speed of rotation.

2. A closed cycle Rankine engine as claimed in claim 1, wherein the axial spacing between the annular condenser fins and the inner and outer radii thereof are correlated with respect to one another and the speed of rotation to cause cooling fluid to be conveyed and accelerated by viscosity shear forces outwardly between the adjacent fins to the velocity providing maximum total heat exchange from the cooling fluid to the exhaust vapor in the heat exchange tubes to condense said vapor.

3. A closed cycle Rankine engine as claimed in claim 1, wherein the condenser includes regeneration means rotatable wherewith providing heat exchange to pre-cool the exhaust vapor before entering the heat exchange tubes and correspondingly preheat the condensate from said tubes before return to the boiler, said regeneration means being spaced from the rotation axis a radial distance greater than the heat exchange tubes and less than the boiler liquid inner surface, and the radial location of the regeneration means being such that the liquid in said regeneration means is under pressure sufficient to prevent vaporization of said liquid during preheating thereof in the regeneration means.

4. A closed cycle Rankine engine as claimed in claim 3, wherein the outer radius of the condenser fins is less than the radial distance of the boiler liquid inner surface from the rotation axis, and the regeneration means is arranged circumferentially about said fins.

5. A closed cycle Rankine engine as claimed in claim 4, wherein the annular boiler comprises an annular liquid supply chamber concentrically therein, and the greatest radius of said annular liquid supply chamber is at least equal to the greatest radius of the regeneration means.

6. A closed cycle Rankie engine as claimed in claim 4, wherein the cooling fluid accelerated outwardly between the adjacent fins engages said regeneration means and assists in cooling the exhaust vapor therein.

7. A closed cycle Rankie engine as claimed in claim 1, wherein the expander comprises a series of nozzles and a turbine disposed concentrically within the annular boiler and includes a rotor mounted for rotation coaxially of the rotation axis of the boiler and condenser.

8. A closed cycle Rankine engine as claimed in claim 7, wherein the axial spacing between the annular condenser fins and the inner and outer radii thereof are correlated with respect to one another and the speed of rotation to cause cooling fluid to be conveyed and accelerated by viscosity shear forces outwardly between the adjacent fins to the velocity providing maximum total heat exchange from cooling fluid to the exhaust vapor in the heat exchange tubes to condense said vapor.

9. A closed cycle Rankine engine as claimed in claim 1, wherein scavenging means is provided operable to evacuate from the heat exchange tubes air and other non-condensables entrained in the exhaust vapor therein.

10. A closed cycle Rankine engine as claimed in claim 9, wherein the scavenging means is operated automatically by rotation of the condenser.

11. A closed cycle Rankine engine as claimed in claim 2, wherein the condenser includes regeneration means rotatable therewith providing heat exchange to pre-cool the exhaust vapor before entering the heat exchange tubes and correspondingly preheat the condensate from said tubes before return to the boiler, said regeneration means being spaced from the rotation axis a radial distance greater than the heat exchange tubes and less than the boiler liquid inner surface, and the radial location of the regeneration means being such that the liquid in said regeneration means is under pressure sufficient to prevent vaporization of said liquid during preheating thereof in the regeneration means.

12. A closed cycle Rankine engine as claimed in claim 11, wherein the outer radius of the condenser fins is less than the radial distance of the boiler liquid inner surface from the rotation axis, the regeneration means is arranged circumferentially about said fins, and the inner radial distance of the annular boiler chamber from said rotation axis is at least as great as the outer radius of said regeneration means.

13. A closed cycle Rankine engine as claimed in claim 12, wherein the annular boiler comprises an annular liquid supply chamber concentrically therein, and the greatest radius of said annular liquid supply chamber is at least equal to the greatest radius of the regeneration means.

14. A closed cycle Rankine engine as claimed in claim 2, wherein the cooling fluid accelerated outwardly between the adjacent fins engages said regeneration means and assists in cooling the exhaust vapor therein.

15. A closed cycle Rankine engine as claimed in claim 14, wherein the expander comprises a series of nozzles and a turbine disposed concentrically within the annular boiler and includes a rotor mounted for rotation coaxially of the rotation axis of the boiler and condenser.

16. A closed cycle Rankine engine as claimed in claim 11, wherein the expander comprises a series of nozzles and a turbine disposed concentrically within the annular boiler and includes a rotor mounted for rotation coaxially of the rotation axis of the boiler and condenser.

17. A closed cycle Rankine engine as claimed in claim 7, wherein rotation of the turbine rotor is in the direction opposite rotation of the boiler and condenser.

18. A closed cycle Rankine engine as claimed in claim 16, wherein rotation of the turbine rotor is in the direction opposite rotation of the boiler and condenser.

References Cited

UNITED STATES PATENTS

| | | | |
|---|---|---|---|
| 2,154,481 | 4/1939 | Vorkauf | 122—11 X |
| 2,525,804 | 10/1950 | Kellogg | 122—11 X |
| 3,221,807 | 12/1965 | Johansson | 122—11 X |
| 3,312,065 | 4/1967 | Guin | 60—108 |
| 2,576,284 | 11/1951 | Crocchi | 60—108 |

MARTIN P. SCHWADRON, Primary Examiner

A. M. OSTRAGER, Assistant Examiner

U.S. Cl. X.R.

60—108; 122—11